(12) United States Patent
Chuang et al.

(10) Patent No.: US 8,164,379 B2
(45) Date of Patent: Apr. 24, 2012

(54) VOLTAGE GENERATOR CAPABLE OF PREVENTING LATCH-UP AND METHOD THEREOF

(75) Inventors: Chen-Jung Chuang, Hsinchu (TW); Chin-Yuan Tu, Taoyuan County (TW); Cheng-Chung Huang, Hsinchu (TW); Hong-Jun Hsiao, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 249 days.

(21) Appl. No.: 12/651,483

(22) Filed: Jan. 4, 2010

(65) Prior Publication Data
US 2011/0001534 A1   Jan. 6, 2011

(30) Foreign Application Priority Data
Jul. 1, 2009   (TW) ................................ 98122241 A

(51) Int. Cl.
*G05F 1/10* (2006.01)
(52) U.S. Cl. ......................................................... 327/536
(58) Field of Classification Search .................. 327/535, 327/536, 537
See application file for complete search history.

(56) References Cited

U.S. PATENT DOCUMENTS
7,990,204 B2 *   8/2011   Kim et al. ..................... 327/536
* cited by examiner

*Primary Examiner* — Jeffrey Zweizig
(74) *Attorney, Agent, or Firm* — Winston Hsu; Scott Margo

(57) ABSTRACT

A voltage generator capable of preventing latch-up is disclosed. The voltage generator includes a positive charge pump unit, a negative charge pump unit, a second stage charge pump unit, and a control unit. The positive charge pump unit is utilized for generating a positive charge pump voltage according to a first enable signal. The negative charge pump is utilized for generating a negative charge pump voltage according to a second enable signal. The second stage charge pump unit is utilized for generating a gate-on voltage and a gate-off voltage according to a third enable signal and a fourth enable signal. The control unit is utilized for generating the first enable signal, the second enable signal, the third enable signal, and the fourth enable signal and make the second stage charge pump unit generate the gate-on voltage (or the gate-off voltage) in a successively-increasing (or decreasing) manner.

32 Claims, 6 Drawing Sheets

VOLTAGE GENERATOR CAPABLE OF PREVENTING LATCH-UP AND METHOD THEREOF

BACKGROUND OF THE INVENTION

1. Field of the Invention

The present invention relates to a voltage generator and related method, and more particularly, to a voltage generator capable of preventing latch-up and related method.

2. Description of the Prior Art

Charge pump circuits are typically applied in driving circuits of electronic products, such as memory drivers, LCD backlight modules, and LED backlight drivers. The charge pump circuit accomplishes energy transfer and voltage conversion by using charges stored on capacitors to establish required positive or negative high output voltages, and also simultaneously provides different output voltages at various voltage levels.

Please refer to FIG. 1. FIG. 1 is a schematic diagram of a charge pump circuit 10 according to the prior art. As shown in FIG. 1, the charge pump circuit 10 includes a positive charge pump unit 102, a negative charge pump unit 104, a second stage charge pump unit 106, and a diode 108. The positive charge pump unit 102 is used for converting an input voltage VCI to a positive charge pump voltage AVDD, which is usually multiple times the input voltage VCI. The negative charge pump unit 104 is used for converting the input voltage VCI to a negative charge pump voltage VCL, which is a negative voltage and usually a negative multiple times the input voltage VCI. The second stage charge pump unit 106 is coupled to the positive charge pump unit 102 and the negative charge pump unit 104 for generating a gate-on voltage VGH (positive voltage) and a gate-off voltage VGL (negative voltage) sent to a system according to the positive charge pump voltage AVDD and the negative charge pump voltage VCL. The diode 108 is coupled to the second stage charge pump unit 106 for preventing latch-up during power up.

Please refer to FIG. 2. FIG. 2 is a schematic diagram of signal waveforms of each component of the charge pump circuit 10 shown in FIG. 1 under different power-on sequences. Suppose the charge pump circuit 10 generates the gate-on voltage VGH at six times the input voltage VCI (VGH=6VCI) and the gate-on voltage VGH at five times the negative input voltage VCI (VGL=−5VCI). In FIG. 2, the signal waveforms from top to bottom are the gate-on voltage VGH, the positive charge pump voltage AVDD, the negative charge pump voltage VCL, the gate-off voltage VGL, a second enable signal VCL_EN, a third enable signal VGH_EN, a fourth enable signal VGL_EN, and a first enable signal AVDD_EN. Suppose when the first enable signal AVDD_EN is switched to an enable state (i.e. high voltage level), the positive charge pump unit 102 begins to generate the positive charge pump voltage AVDD. When the third enable signal VGH_EN is switched to the enable state, the second stage charge pump unit 106 begins to generate the gate-on voltage VGH. When the fourth enable signal VGL_EN is switched to the enable state, the negative charge pump unit 104 begins to generate the gate-off voltage VGL. When the second enable signal VCL_EN is switched to an enable state, the negative charge pump unit 104 begins to generate the negative charge pump voltage VCL. As shown in FIG. 2, at a time t1, the positive charge pump unit 102 starts to set up the positive charge pump voltage AVDD, and at a time point t2, the second stage charge pump unit 106 begins to output the gate-on voltage VGH. Similarly, the gate-off voltage VGL and the negative charge pump voltage VCL are obtained in turn. In other words, the power on sequence is as follows: AVDD→VGH→VGL→VCL.

However, as the charge pump circuit 10 generates the gate-on voltage VGH or the gate-off voltage VGL, parasitic bipolar transistors conduct unexpectedly, leading to leakage current due to the gate-on voltage VGH or the gate-off voltage VGL being directly increased or decreased to a target voltage. In such a condition, at the beginning of generating the gate-on voltage VGH, the gate-off voltage VGL undergoes a sharply increasing transient voltage effect (a point P1 shown in FIG. 2). Similarly, at the beginning of generating the gate-off voltage VGL, the gate-on voltage VGH has a sharply decreasing transient voltage effect (a point P2 shown in FIG. 2). Also, in a high voltage and high temperature environment, latch-up may occur due to a leakage current effect, and may even destroy the charge pump circuit 10. Therefore, to solve the abovementioned problem, the conventional method usually uses the diode 108 for clamping the voltage level of the gate-off voltage VGL outputted from the second stage charge pump unit 106 to prevent the latch-up phenomenon. As a result, an extra diode element is required, thereby causing increased manufacturing cost.

SUMMARY OF THE INVENTION

It is therefore an objective of the present invention to provide a voltage generator capable of preventing latch-up and method thereof.

The present invention discloses a voltage generator capable of preventing latch-up, which comprises a positive charge pump unit, for generating a positive charge pump voltage according to an input voltage and a first enable signal; a negative charge pump unit, for generating a negative charge pump voltage according to the input voltage and a second enable signal; a second stage charge pump unit, coupled to the positive charge pump unit and the negative charge pump unit, for generating a gate-on voltage and a gate-off voltage according to a third enable signal, a fourth enable signal, a positive target multiplication factor, a negative target multiplication factor, the positive charge pump voltage and the negative charge pump voltage; and a control unit, coupled to the positive charge pump unit, the negative charge pump unit, and the second stage charge pump unit, for generating the first enable signal, the second enable signal, the third enable signal, the fourth enable signal, the positive target multiplication factor and the negative target multiplication factor to control the second stage charge pump unit to generate the gate-on voltage in a successively-increasing manner until the gate-on voltage conforms to the positive target multiplication factor and generate the gate-off voltage in a successively-decreasing manner until the gate-off voltage conforms to the negative target multiplication factor.

The present invention further discloses a voltage generation method capable of preventing latch-up, which comprises generating a positive charge pump voltage according to an input voltage and a first enable signal; generating a negative charge pump voltage according to the input voltage and a second enable signal; and generating a gate-on voltage in a successively-increasing manner until the gate-on voltage conforms to the positive target multiplication factor and generating a gate-off voltage in a successively decreasing manner until the gate-off voltage conforms to the negative target multiplication factor according to the third enable signal, the fourth enable signal, the positive target multiplication factor, the negative target multiplication factor, the positive charge pump voltage and the negative charge pump voltage.

The present invention further discloses a voltage generator capable of preventing latch-up, which comprises a positive charge pump unit, for generating a positive charge pump voltage according to an input voltage and a first enable signal; a negative charge pump unit, for generating a negative charge pump voltage according to the input voltage and a second enable signal; a second stage charge pump unit, coupled to the positive charge pump unit and the negative charge pump unit, for generating a gate-on voltage and a gate-off voltage according to a third enable signal, a fourth enable signal, a positive target multiplication factor, a negative target multiplication factor, the positive charge pump voltage and the negative charge pump voltage; and a control unit, coupled to the positive charge pump unit, the negative charge pump unit, and the second stage charge pump unit, for generating the first enable signal, the second enable signal, the third enable signal, the fourth enable signal, the positive target multiplication factor and the negative target multiplication factor and control the second enable signal is first switched to an enable state before the first enable signal, third enable signal, and the fourth enable signal are switched to the enable state.

The present invention further discloses a voltage generation method capable of preventing latch-up, which comprises generating a positive charge pump voltage according to an input voltage and a first enable signal; generating a negative charge pump voltage according to the input voltage and a second enable signal; generating a gate-on voltage and a gate-off voltage according to a third enable signal, a fourth enable signal, a positive target multiplication factor, a negative target multiplication factor, the positive charge pump voltage and the negative charge pump voltage; and switching the second enable signal at an enable state before the first enable signal, third enable signal, and the fourth enable signal are switched to the enable state.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
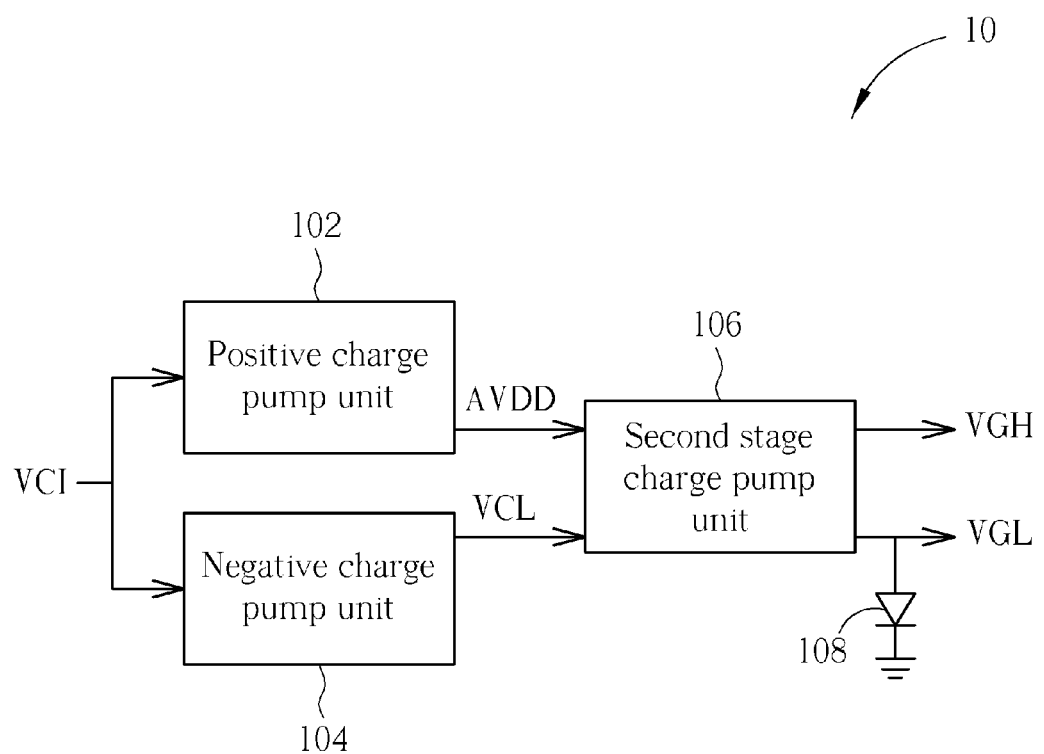
FIG. 1 is a schematic diagram of a charge pump circuit according to the prior art.
Figure 2:
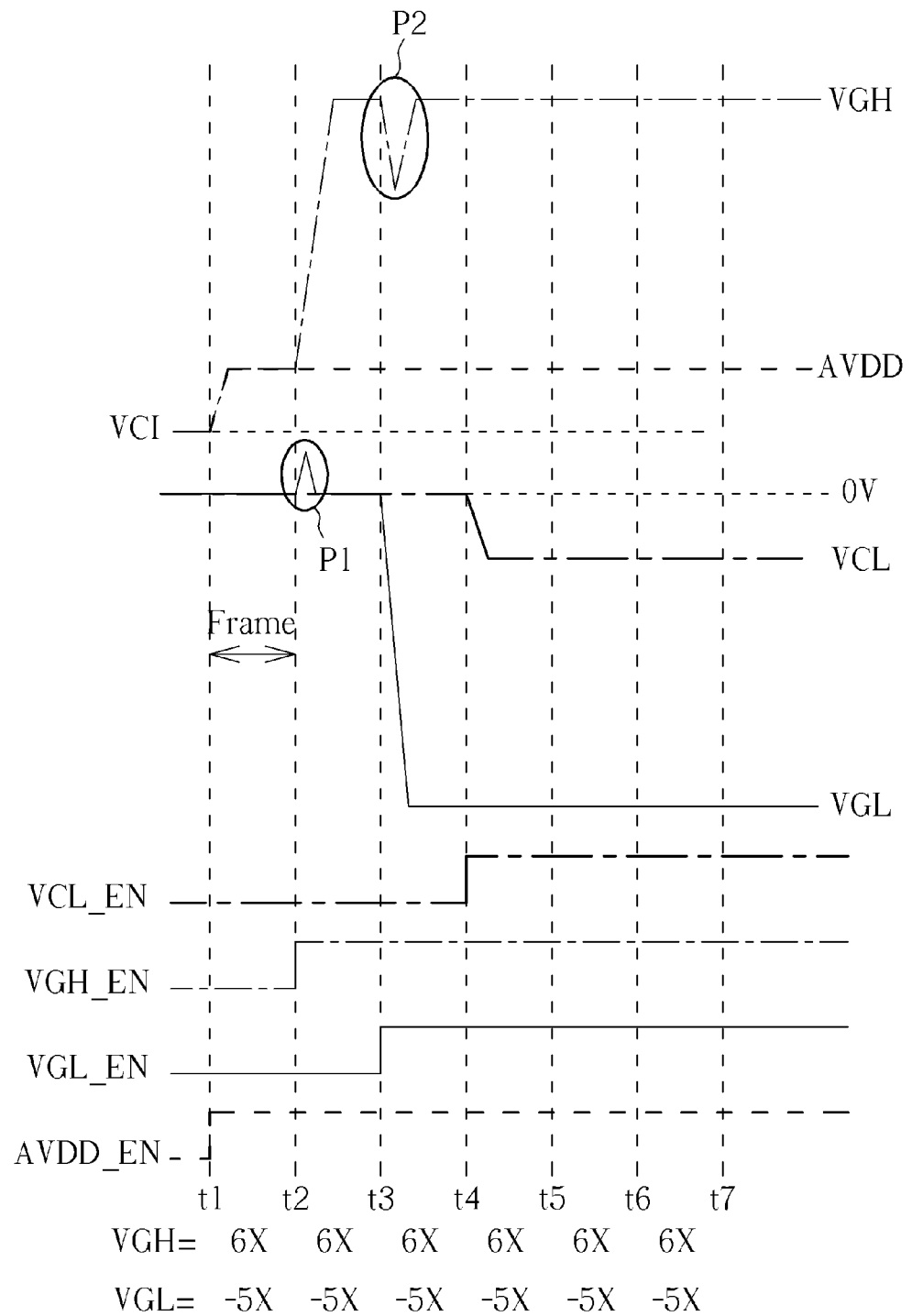
FIG. 2 is a schematic diagram of signal waveforms of each components of the charge pump circuit shown in FIG. 1 under different power on sequences.
Figure 3:
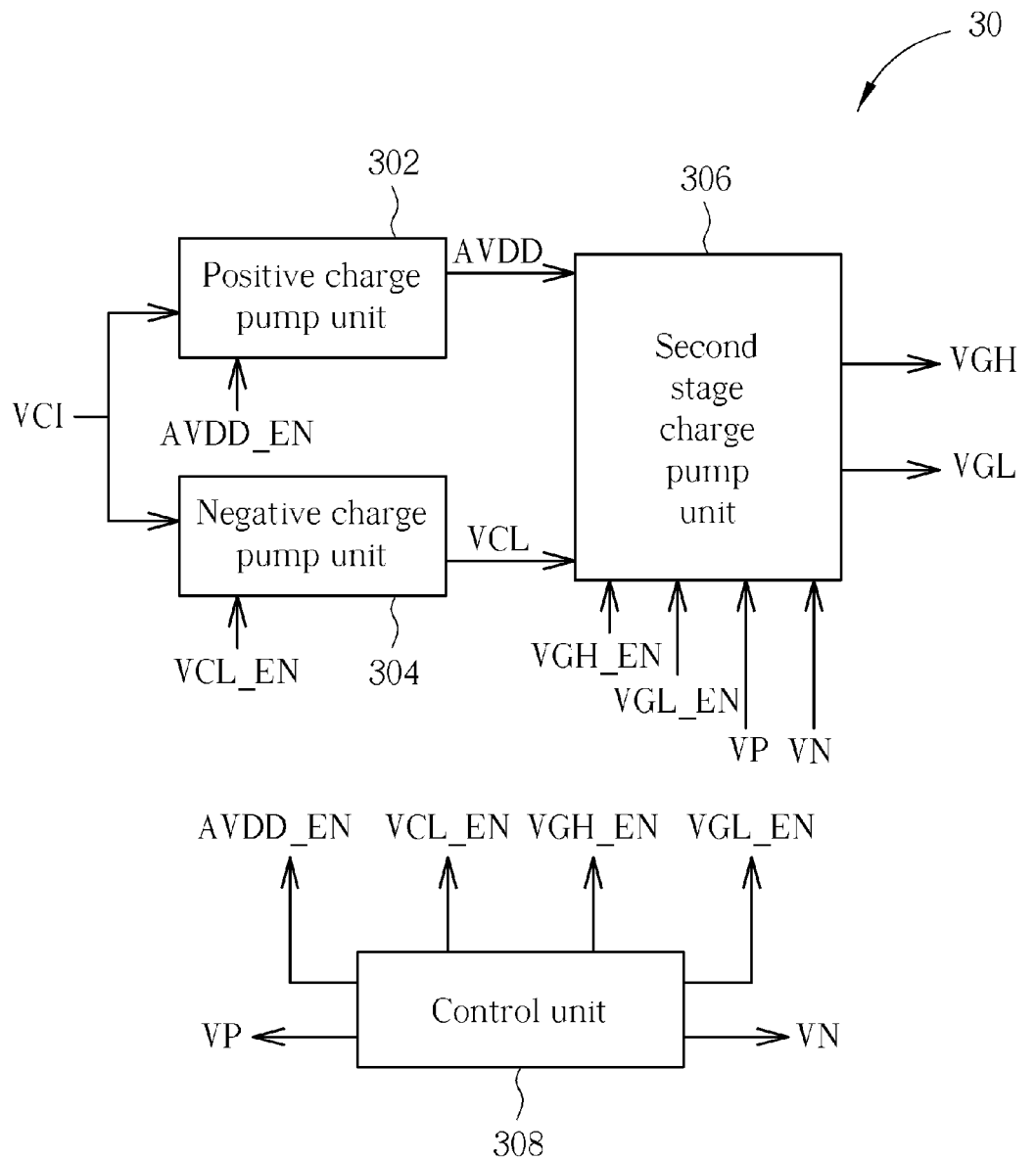
FIG. 3 is a schematic diagram of a voltage generator capable of preventing latch-up according to an embodiment of the present invention.

Please refer to FIG. 3, which is a schematic diagram of a voltage generator 30 capable of preventing latch-up according to an embodiment of the present invention. The voltage generator 30 includes a positive charge pump unit 302, a negative charge pump unit 304, a second stage charge pump unit 306, and a control unit 308. The positive charge pump unit 302 is utilized for generating a positive charge pump voltage AVDD according to an input voltage VCI and a first enable signal AVDD_EN. The negative charge pump unit 304 is utilized for generating a negative charge pump voltage VCL according to input voltage VCI and a second enable signal VCL_EN. The second stage charge pump unit 306 is coupled to the positive charge pump unit 302 and the negative charge pump for generating a gate-on voltage VGH and a gate-off voltage VGL according to a third enable signal VGH_EN, a fourth enable signal VGL_EN, a positive target multiplication factor VP, a negative target multiplication factor VN, the positive charge pump voltage VCL and the negative charge pump voltage VCL. Again, the control unit 308 is coupled to the positive charge pump unit 302, the negative charge pump unit 304, and the second stage charge pump unit 306 for generating the first enable signal AVDD_EN, the second enable signal VCL_EN, the third enable signal VGH_EN, the fourth enable signal VGL_EN, the positive target multiplication factor VP and the negative target multiplication factor VN so as to make the second stage charge pump unit 306 generate the gate-on voltage VGH in a successively increasing manner until the gate-on voltage VGH conforms to the positive target multiplication factor VP, and generate the gate-off voltage VGL in a decreasing manner sequentially until the gate-off voltage VGL conforms to the negative target multiplication factor VN. In other words, the gate-on voltage VGH (the gate-off voltage VGL) can be progressively increased (decreased) up to satisfy the positive target multiplication factor VP (the negative target multiplication factor VN) by the second stage charge pump unit 306. As a result, the voltage generator 30 of the present invention will not make gate-on voltage VGH and a gate-off voltage VGL suddenly reach the corresponding target multiplication factor so as to prevent leakage current within components.

In brief, as mentioned in the prior art, if the gate-on (gate-on) voltage is generated in one go, the parasitic bipolar transistors of the voltage generator may unexpectedly turn on to result in leakage current due to a larger voltage across the parasitic transistors. On the contrary, the present invention lets the second stage charge pump unit 306 increase the voltage level of the gate-on voltage VGH (gate-off voltage VGL) progressively with multiple steps until the gate-on voltage VGH (gate-off voltage VGL) conforms to the positive target multiplication factor VP (the negative target multiplication factor VN). As a result, the present invention can avoid the leakage current and prevent the latch up effect effectively.

Note that, the positive target multiplication factor VP or the negative target multiplication factor VN indicates a desired target voltage obtained from the voltage generator 30, and those skilled in the art can set the required multiplication factor via the control unit 308 based on their particular requirements. In the embodiment, the positive target multiplication factor VP or the negative target multiplication factor VN is set to be a multiple of the input voltage VCI, such as the positive target multiplication factor VP can be six times the input voltage VCI (6VCI), or the negative target multiplication factor VN can be five times the negative input voltage VCI (−5VCI), but this is not a limitation of the present invention. On the other hand, the positive charge pump unit 302, the negative charge pump unit 304, and the second stage charge pump unit 306 are well known by those skilled in the art, and those skilled in the art can design various multiplication factors of output voltage based on their particular requirements. For example, the positive charge pump unit 302 can generate the positive charge pump voltage AVDD at double the input voltage VCI (i.e. AVDD=2 VCI). The negative charge pump unit 304 can generate the negative charge pump voltage VCL equal to the negative input voltage VCI (i.e. VCL=−VCI).

After that, the second stage charge pump unit 306 can generate output voltage signals multiplicative with the positive charge pump voltage AVDD or the negative charge pump voltage VCL.

Figure 4:
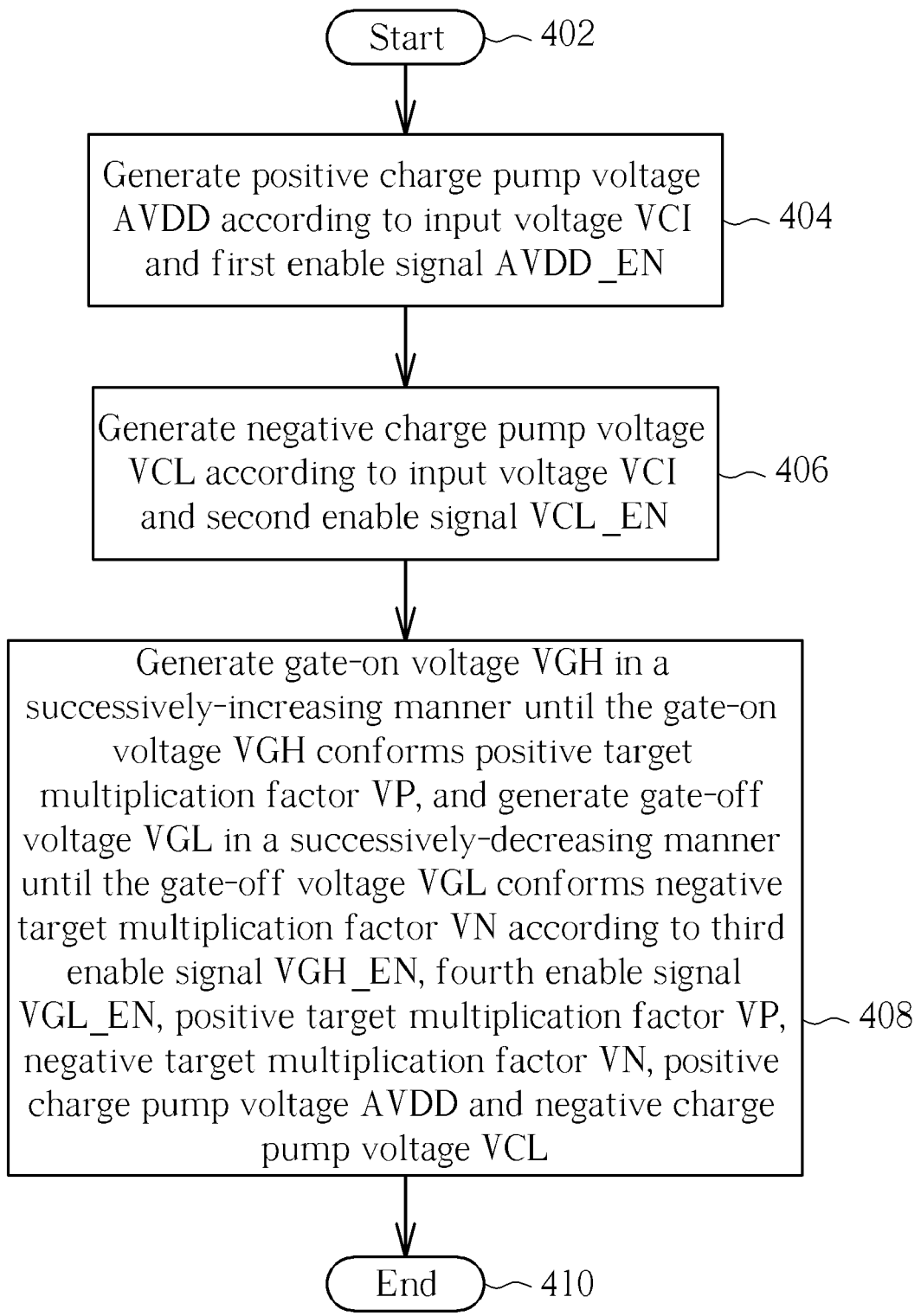
FIG. 4 is a procedure according to an embodiment of the invention.

As to the implementation of the voltage generator 30, please refer to FIG. 4. FIG. 4 is a procedure 40 according to an embodiment of the invention. The procedure 40 is utilized for implementing voltage generating procedure for the voltage generator 30. The procedure 40 comprises the following steps:

Step 402: Start.

Step 404: Generate positive charge pump voltage AVDD according to input voltage VCI and first enable signal AVDD_EN.

Step 406: Generate negative charge pump voltage VCL according to input voltage VCI and second enable signal VCL_EN.

Step 408: Generate gate-on voltage VGH in a successively-increasing manner until the gate-on voltage VGH conforms to positive target multiplication factor VP, and generate gate-off voltage VGL in a successively decreasing manner until the gate-off voltage VGL conforms to negative target multiplication factor VN according to third enable signal VGH_EN, fourth enable signal VGL_EN, positive target multiplication factor VP, negative target multiplication factor VN, positive charge pump voltage AVDD and negative charge pump voltage VCL.

Step 410: End.

According to procedure 40, the present invention utilizes the control unit 308 to control an enable sequence of the first enable signal AVDD_EN, the second enable signal VCL_EN, the third enable signal VGH_EN, and the fourth enable signal VGL_EN, and to make the second stage charge pump unit 306 pull up the gate-on voltage VGH in a progressively increasing manner until the gate-on voltage VGH conforms to positive target multiplication factor VP according to positive target multiplication factor VP, negative target multiplication factor VN, positive charge pump voltage AVDD and negative charge pump voltage VCL. Furthermore, the second stage charge pump unit 306 pulls down the gate-off voltage VGL in a progressively decreasing manner until the gate-off voltage VGL conforms to negative target multiplication factor VN. As can be seen, the second stage charge pump unit 306 can increase the output voltage in a soft-start-mechanism-like manner at each time interval to avoid the leakage current effect. Please note that, in FIG. 4, the sequence of the steps 404 to 408 is an exemplary embodiment of the present invention, and the sequence should not be a limitation of the present invention. Circuit designers can arrange the sequence accordingly depending on their requirements.

On the other hand, in the voltage generator 30, the control unit 308 can control the enable sequence for the enable signals to achieve various voltage generation purposes. For example, please refer to FIG. 5, which is a procedure 50 according to an embodiment of the invention. The procedure 50 is utilized for implementing voltage generating procedure for the voltage generator 30. The procedure 50 comprises the following steps:

Step 502: Start.

Step 504: Generate positive charge pump voltage AVDD according to input voltage VCI and first enable signal AVDD_EN.

Step 506: Generate negative charge pump voltage VCL according to input voltage VCI and second enable signal VCL_EN.

Step 508: Generate gate-on voltage VGH and gate-off voltage VGL according to third enable signal VGH_EN, fourth enable signal VGL_EN, positive target multiplication factor VP, negative target multiplication factor VN, positive charge pump voltage AVDD and negative charge pump voltage VCL.

Step 510: The second enable signal VCL_EN is first switched to an enable state before the first enable signal AVDD_EN, the third enable signal VGH_EN, and the fourth enable signal VGL_EN are switched to the enable state.

Step 512: End.

According to procedure 50, compared with other enable signals, the second enable signal VCL_EN will be first switched to the enable state. In other words, the control unit 308 controls the second enable signal VCL_EN to convert to logic high level before the first enable signal AVDD_EN, the third enable signal VGH_EN, and the fourth enable signal VGL_EN are switched to the enable state. In such a condition, the present invention can prevent the gate-off voltage VGL from exceeding 0 volts while a temporary sharp increasing effect caused by outputting the gate-on voltage VGH takes place, so as to prevent leakage current effect.

In addition, in the embodiment of the invention, assume that the mentioned enable state is logic high level, and the mentioned disable state is logic low level for brevity of description. As a result, each component of the voltage generator 30 is able to perform its corresponding operation according to corresponding enable signal. For example, each of the components can perform a specific voltage conversion operation when the corresponding enable signal is at an enable state so that the output voltage of the component will be a specific times the input voltage. Otherwise, when the corresponding enable signal is at a disable state, each of the components outputs the received input voltage without any voltage conversion operation. Moreover, the present invention utilizes the control unit 308 to generate the second enable signal VCL_EN to make the negative charge pump voltage VCL be the first to be generated. As a result, from the time the voltage generator 30 starts to operate, the negative charge pump voltage VCL is pulled down under 0 volts. In such a condition, as soon as the temporary sharp increasing effect takes place, the gate-off voltage VGL will not exceed 0 volts, even if the voltage generator 30 generates the gate-on voltage VGH without using a progressively decreasing manner. On other hand, for the power on sequences, the negative charge pump voltage VCL can be set to be the first, and the others can be arranged based on any specific requirements. For example, the third enable signal VGH_EN and the fourth enable signal VGL_EN are switched to the enable state simultaneously after the second enable signal VCL_EN has been switched to the enable state. After that, the first enable signal AVDD_EN is switched to the enable state. In this way, the power on sequence is: VCL→VGH: VGL→AVDD, but this should not be a limitation of the present invention. Any other power on sequence is available only if the negative charge pump voltage VCL is set to be the first.

Furthermore, for generating the gate-on voltage VGH (gate-off voltage VGL) in a successively-increasing (or decreasing) manner, the second stage charge pump unit 306 increases the gate-on voltage VGH by a first predetermined voltage value every predetermined time interval according to the third enable signal VGH_EN, the positive target multiplication factor VP, and the positive charge pump voltage AVDD until the gate-on voltage VGH conforms to the positive target multiplication factor VP. By the same token, the second stage charge pump unit 306 decreases the gate-off voltage VGL by a second predetermined voltage value every the predetermined time interval according to the fourth enable signal VGL_EN, the negative target multiplication factor VN, and the negative charge pump voltage VCL until the gate-off voltage VGL conforms to the negative target multiplication factor VN. Preferably, the first predetermined voltage value is smaller than the positive charge pump voltage AVDD, and the second predetermined voltage value is smaller than the negative charge pump voltage VCL, but this should not be a limitation of the present invention. For example, the predetermined time interval can be set as a frame time interval (e.g. 16 ms), and the first predetermined voltage value and the second predetermined voltage value can be set to be equal to the input voltage VCI. In such a condition, the gate-on voltage VGH (the gate-off voltage VGL) will be increased (decreased) by a voltage level of the input voltage every frame time interval up to the corresponding target multiplication factor progressively.

Figure 5:
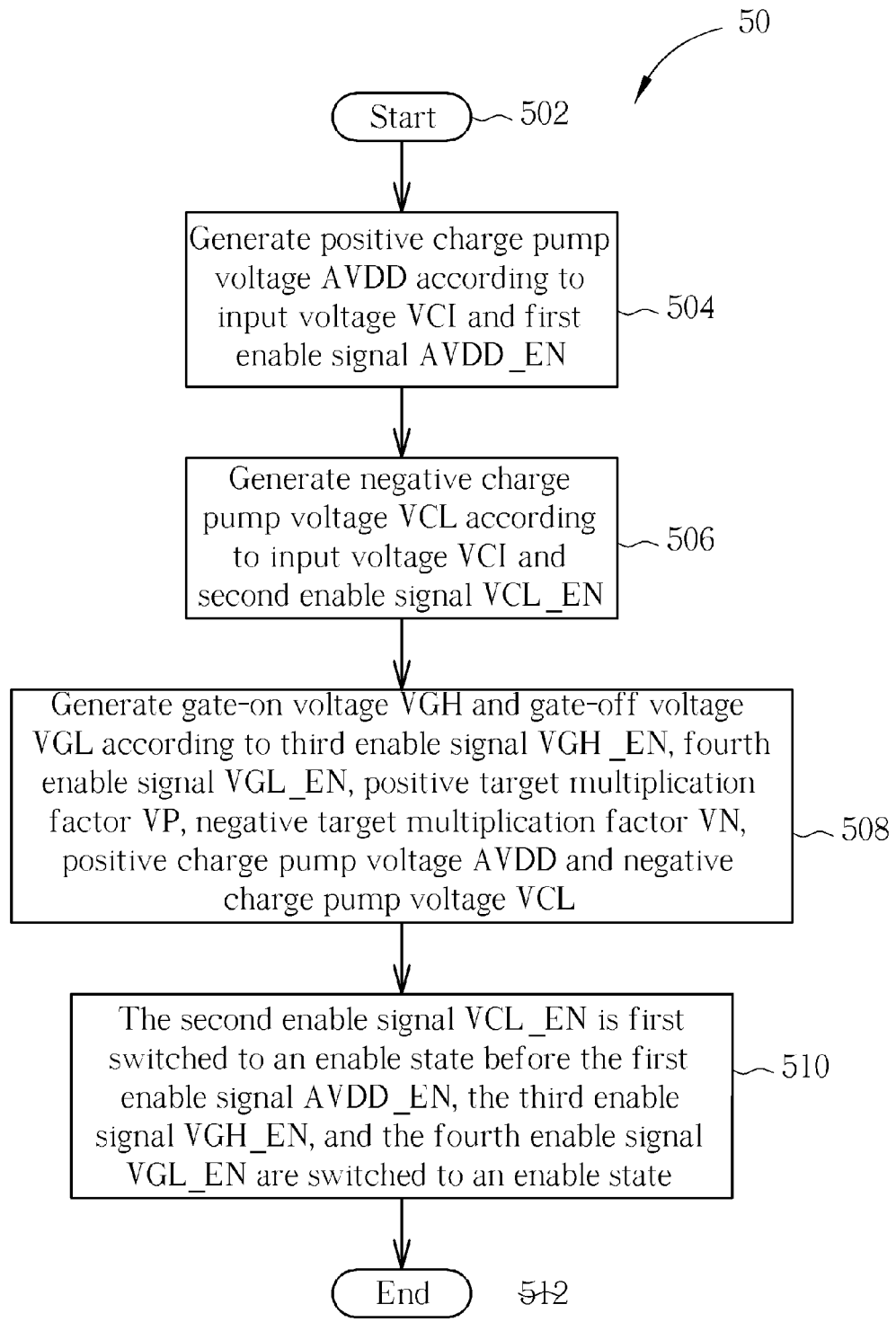
FIG. 5 is a procedure according to an embodiment of the invention.
Figure 6:
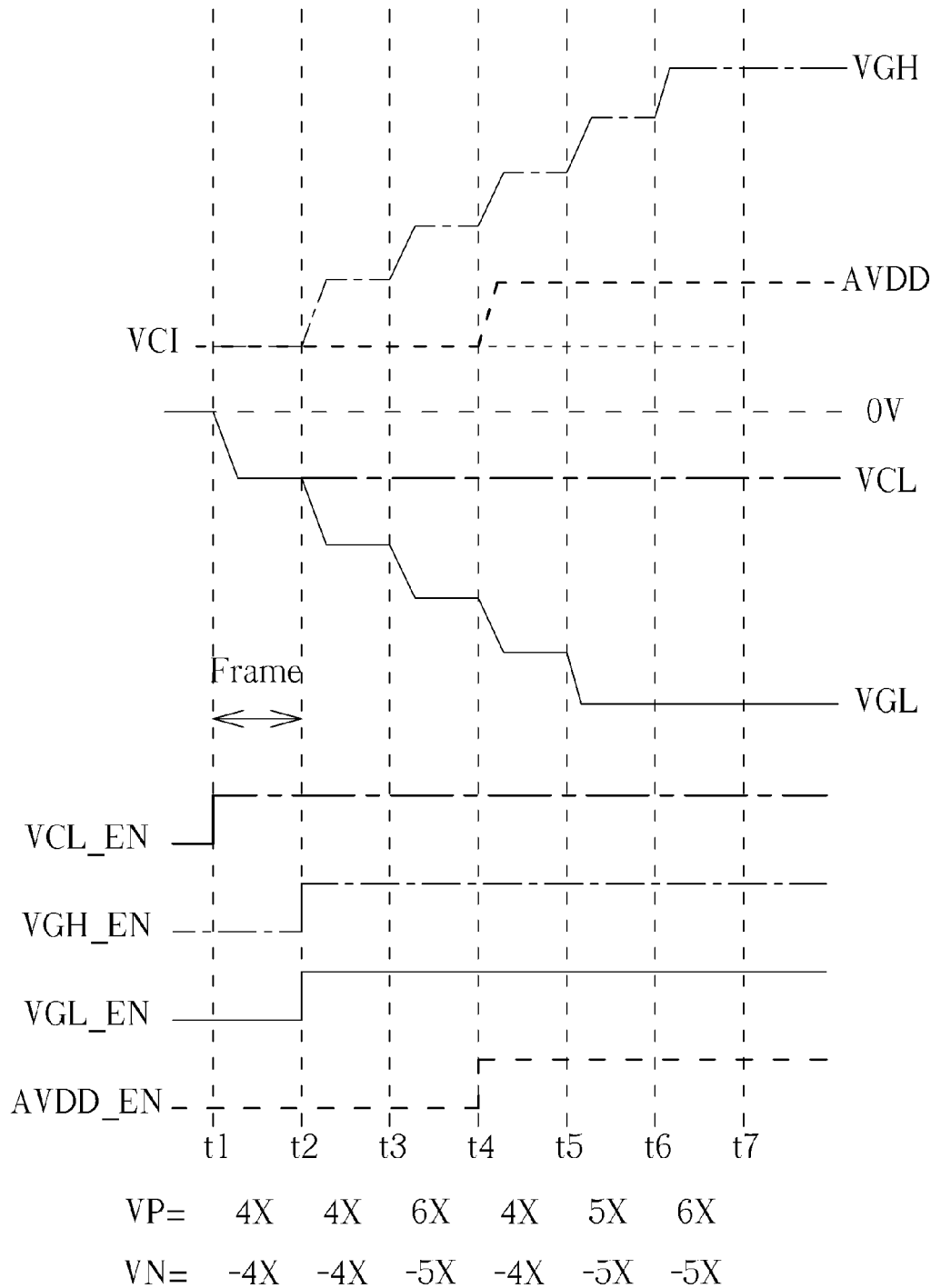
FIG. 6 is a schematic diagram of signal waveforms of each components of the voltage generator shown in FIG. 3 according to an embodiment of the present invention.

The following further illustrates operation of the voltage generator 30. Taking the positive target multiplication factor VP is six times the input voltage VCI (VP=6VCI) and the negative target multiplication factor VN is five times the negative input voltage VCI (VN=−5VCI) as an example, please refer to FIG. 6, which is a schematic diagram of signal waveforms of each components of the voltage generator 30 shown in FIG. 3 according to an embodiment of the present invention. Assume that each time interval is a frame time interval, the positive charge pump unit 302 can generate the positive charge pump voltage AVDD which is two times the input voltage VCI (i.e. AVDD=2 VCI), and the negative charge pump unit 304 can generate the negative charge pump voltage VCL which is one times the positive input voltage −VCI (i.e. VCL=−VCI). In FIG. 5, the signal waveforms from top to bottom are the gate-on voltage VGH, the positive charge pump voltage AVDD, the negative charge pump voltage VCL, the gate-off voltage VGL, the second enable signal VCL_EN, the third enable signal VGH_EN, the four enable signal VGL_EN, and first enable signal AVDD_EN. As shown in FIG. 5, at a time point t1, the second enable signal VCL_EN is at the enable sate, and the negative charge pump voltage VCL begins to increase up to a negative input voltage level. At a time point t2, the third enable signal VGH_EN, the four enable signal VGL_EN enable simultaneously, so that the gate-on voltage VGH (the gate-off voltage VGL) increases (decreases) a voltage level (e.g. input voltage VCI) every one time interval. Again, at a time point t4, the first enable signal AVDD_EN is enabled, and the positive charge pump voltage AVDD begins to increase. At this moment, the gate-on voltage VGH has reached three times the input voltage VCI, and the gate-off voltage VGL has also been pulled down to three times the negative input voltage. As shown in FIG. 6, during the period between time points t4 and t5, the positive charge pump voltage AVDD has raised to be two times the input voltage VCI. To continue progressively increasing the gate-on voltage VGH, the control unit 308 can reduce the positive target multiplication factor VP to a positive intermediate multiplication factor MP (MP=4VCI) so that the positive charge pump voltage AVDD rises about one times the input voltage VCI during the period between the time point t4 and t5. In the above manner (e.g. progressively increasing the target multiplication factor, such as to four times, five times, and six times the input voltage VCI), the gate-on voltage VGH increases upward stage-by-stage to conform to the original positive target multiplication factor VP (6VCI). Similarly, the control unit 308 can adjust the negative target multiplication factor VN to a negative intermediate multiplication factor MN to make the gate-off voltage VGL decrease successively down to conform to the original negative target multiplication factor VN (−5VCI).

In summary, the voltage generator of the present invention can enable the negative charge pump voltage VCL during the beginning operation for preventing the transient voltage sharp increasing (or decreasing) effect to avoid leakage current. Moreover, the present invention provides the gate-on voltage VGH (the gate-off voltage VGL) increasing (decreasing) by a predetermined voltage level at each step, which is similar to a soft start mechanism for the gate-on voltage VGH (the gate-off voltage VGL), so as to avoid turning on the parasitic transistors and further prevent latch-up effectively. On the other hand, compared with the prior art, the present invention can provide the required voltages for the system without using an extra diode element for preventing latch up, reducing manufacturing cost.

Those skilled in the art will readily observe that numerous modifications and alterations of the device and method may be made while retaining the teachings of the invention.

What is claimed is:

1. A voltage generator capable of preventing latch-up, comprising:
   a positive charge pump unit, for generating a positive charge pump voltage according to an input voltage and a first enable signal;
   a negative charge pump unit, for generating a negative charge pump voltage according to the input voltage and a second enable signal;
   a second stage charge pump unit, coupled to the positive charge pump unit and the negative charge pump unit, for generating a gate-on voltage and a gate-off voltage according to a third enable signal, a fourth enable signal, a positive target multiplication factor, a negative target multiplication factor, the positive charge pump voltage and the negative charge pump voltage; and
   a control unit, coupled to the positive charge pump unit, the negative charge pump unit, and the second stage charge pump unit, for generating the first enable signal, the second enable signal, the third enable signal, the fourth enable signal, the positive target multiplication factor and the negative target multiplication factor to control the second stage charge pump unit to generate the gate-on voltage in a successively-increasing manner until the gate-on voltage conforms to the positive target multiplication factor and to generate the gate-off voltage in a successively-decreasing manner until the gate-off voltage conforms to the negative target multiplication factor.

2. The voltage generator of claim 1, wherein when the first enable signal is at an enable state, the positive charge pump voltage is a specific multiple of the input voltage, and when the first enable signal is at a disable state, the positive charge pump voltage is equal to the input voltage.

3. The voltage generator of claim 1, wherein when the second enable signal is at an enable state, the negative charge pump voltage is a specific negative multiple of the input voltage.

4. The voltage generator of claim 1, wherein the control unit controls the second enable signal to be first switched to an enable state before the first enable signal, the third enable signal and the fourth enable signal are switched to the enable state.

5. The voltage generator of claim 4, wherein the control unit controls the third enable signal and the fourth enable signal to be switched to the enable state simultaneously after the second enable signal has been switched to the enable state.

6. The voltage generator of claim 1, wherein the control unit controls the first enable signal to be switched to the enable state after the second enable signal, the third enable signal and the fourth enable signal have been switched to the enable state.

7. The voltage generator of claim 1, wherein the second stage charge pump unit increases the gate-on voltage by a first predetermined voltage value every predetermined time interval according to the third enable signal, the positive target multiplication factor, and the positive charge pump voltage until the gate-on voltage conforms to the positive target multiplication factor, and decreases the gate-off voltage by a second predetermined voltage value every the predetermined time interval according to the fourth enable signal, the negative target multiplication factor, and the negative charge pump voltage until the gate-off voltage conforms to the negative target multiplication factor.

8. The voltage generator of claim 7, wherein when the third signal is switched to the enable state, the second stage charge pump unit begins to generate the gate-on voltage.

9. The voltage generator of claim 8, wherein when the first enable signal is switched to the enable state, the control unit generates a positive intermediate multiplication factor according to time and transfers the positive intermediate multiplication factor to the second stage charge pump unit, and the second stage charge pump unit increases the gate-on voltage by the first predetermined voltage value during each predetermined time interval according to the positive intermediate multiplication factor and the positive charge pump voltage until the gate-on voltage conforms to the positive target multiplication factor.

10. The voltage generator of claim 9, wherein the positive intermediate multiplication factor is smaller than the positive target multiplication factor.

11. The voltage generator of claim 7, wherein when the fourth signal is switched to the enable state, the second stage charge pump unit begins to generate the gate-off voltage.

12. The voltage generator of claim 11, wherein when the second signal is switched to the enable state, the control unit generates a negative intermediate multiplication factor according to time and transfers the negative intermediate multiplication factor to the second stage charge pump unit, and the second stage charge pump unit decreases the gate-off voltage by the second predetermined voltage value during each predetermined time interval according to the negative intermediate multiplication factor and the negative charge pump voltage until the gate-off voltage conforms to the negative target multiplication factor.

13. The voltage generator of claim 12, wherein the negative intermediate multiplication factor is greater than the negative target multiplication factor.

14. A voltage generation method capable of preventing latch-up, comprising:
   generating a positive charge pump voltage according to an input voltage and a first enable signal;
   generating a negative charge pump voltage according to the input voltage and a second enable signal; and
   generating a gate-on voltage in a successively-increasing manner until the gate-on voltage conforms to a positive target multiplication factor and generating a gate-off voltage in a successively-decreasing manner until the gate-off voltage conforms to a negative target multiplication factor according to a third enable signal, a fourth enable signal, the positive target multiplication factor, the negative target multiplication factor, the positive charge pump voltage and the negative charge pump voltage.

15. The voltage generation method of claim 14, wherein when the first enable signal is at an enable state, the positive charge pump voltage is a specific multiple of the input voltage, and wherein when the first enable signal is at a disable state, the positive charge pump voltage is equal to the input voltage.

16. The voltage generation method of claim 14, wherein when the second enable signal is at an enable state, the negative charge pump voltage is a specific negative multiple of the input voltage.

17. The voltage generation method of claim 14, further comprising:
   arranging the second enable signal to be first switched to an enable state before the first enable signal, the third enable signal and the fourth enable signal are switched to the enable state.

18. The voltage generation method of claim 17, wherein the third enable signal and the fourth enable signal are switched to the enable state simultaneously after the second enable signal has been switched to the enable state.

19. The voltage generation method of claim 14, wherein the first enable signal is switched to the enable state after the second enable signal, the third enable signal and the fourth enable signal have been switched to the enable state.

20. The voltage generation method of claim 14, wherein the step of generating the gate-on voltage in the successively-increasing manner until the gate-on voltage conforms to the positive target multiplication factor and generating the gate-off voltage in the successively-decreasing manner until the gate-off voltage conforms to the negative target multiplication factor according to the third enable signal, the fourth enable signal, the positive target multiplication factor, the negative target multiplication factor, the positive charge pump voltage and the negative charge pump voltage comprises:
   increasing the gate-on voltage by a first predetermined voltage value every predetermined time interval according to the third enable signal, the positive target multiplication factor, and the positive charge pump voltage until the gate-on voltage conforms to the positive target multiplication factor; and
   decreasing the gate-off voltage by a second predetermined voltage value every the predetermined time interval according to the fourth enable signal, the negative target multiplication factor, and the negative charge pump voltage until the gate-off voltage conforms to the negative target multiplication factor.

21. The voltage generation method of claim 20, wherein the step of increasing the gate-on voltage by the first predetermined voltage value every the predetermined time interval according to the third enable signal, the positive target multiplication factor, and the positive charge pump voltage until the gate-on voltage conforms to the positive target multiplication factor comprises:
   beginning to generate the gate-on voltage when the third signal is switched to the enable state; and
   increasing the gate-on voltage by the first predetermined voltage value every the predetermined time interval according to the positive target multiplication factor and the positive charge pump voltage until the gate-on voltage conforms to the positive target multiplication factor.

22. The voltage generation method of claim 21, wherein the step of increasing the gate-on voltage by the first predetermined voltage value every the predetermined time interval according to the positive target multiplication factor and the positive charge pump voltage until the gate-on voltage conforms to the positive target multiplication factor comprises:
   generating a positive intermediate multiplication factor according to time when the first enable signal is switched to the enable state; and increasing the gate-on voltage by the first predetermined voltage value during each predetermined time interval according to the positive intermediate multiplication factor and the positive charge pump voltage until the gate-on voltage conforms to the positive target multiplication factor.

23. The voltage generation method of claim 21, wherein the positive intermediate multiplication factor is smaller than the positive target multiplication factor.

24. The voltage generation method of claim 20, wherein the step of decreasing the gate-off voltage by the second predetermined voltage value every the predetermined time interval according to the fourth enable signal, the negative target multiplication factor, and the negative charge pump voltage until the gate-off voltage conforms to the negative target multiplication factor comprises:
  beginning to generate the gate-off voltage when the fourth signal is switched to the enable state; and
  decreasing the gate-off voltage by the second predetermined voltage value every the predetermined time interval according to the negative target multiplication factor and the negative charge pump voltage until the gate-off voltage conforms to the negative target multiplication factor.

25. The voltage generation method of claim 24, wherein the step of decreasing the gate-off voltage by the second predetermined voltage value every the predetermined time interval according to the negative target multiplication factor and the negative charge pump voltage until the gate-off voltage conforms to the negative target multiplication factor comprises:
  generating a negative intermediate multiplication factor according to time when the second signal is switched to the enable state; and
  decreasing the gate-off voltage by the second predetermined voltage value during each predetermined time interval according to the negative intermediate multiplication factor and the negative charge pump voltage until the gate-off voltage conforms to the negative target multiplication factor.

26. The voltage generation method of claim 25, wherein the negative intermediate multiplication factor is smaller than the negative target multiplication factor.

27. A voltage generator capable of preventing latch-up, comprising:
  a positive charge pump unit, for generating a positive charge pump voltage according to an input voltage and a first enable signal;
  a negative charge pump unit, for generating a negative charge pump voltage according to the input voltage and a second enable signal;
  a second stage charge pump unit, coupled to the positive charge pump unit and the negative charge pump unit, for generating a gate-on voltage and a gate-off voltage according to a third enable signal, a fourth enable signal, a positive target multiplication factor, a negative target multiplication factor, the positive charge pump voltage and the negative charge pump voltage; and
  a control unit, coupled to the positive charge pump unit, the negative charge pump unit, and the second stage charge pump unit, for generating the first enable signal, the second enable signal, the third enable signal, the fourth enable signal, the positive target multiplication factor and the negative target multiplication factor and controlling the second enable signal to be first switched to an enable state before the first enable signal, third enable signal, and the fourth enable signal are switched to the enable state.

28. The voltage generator of claim 27, wherein the control unit controls the third enable signal and the fourth enable signal to be switched to the enable state simultaneously after the second enable signal has been switched to the enable state.

29. The voltage generator of claim 27, wherein the control unit controls the first enable signal to be switched to the enable state after the second enable signal, the third enable signal and, the fourth enable signal have been switched to the enable state.

30. A voltage generation method capable of preventing latch-up, comprising:
  generating a positive charge pump voltage according to an input voltage and a first enable signal;
  generating a negative charge pump voltage according to the input voltage and a second enable signal;
  generating a gate-on voltage and a gate-off voltage according to a third enable signal, a fourth enable signal, a positive target multiplication factor, a negative target multiplication factor, the positive charge pump voltage and the negative charge pump voltage; and
  switching the second enable signal at an enable state before the first enable signal, third enable signal, and the fourth enable signal are switched to the enable state.

31. The voltage generation method of claim 30, wherein the third enable signal and the fourth enable signal is switched to the enable state simultaneously after the second enable signal has been switched to the enable state.

32. The voltage generation method of claim 30, wherein the first enable signal is switched to the enable state after the second enable signal, the third enable signal and, the fourth enable signal have been switched to the enable state.

* * * * *